(12) United States Patent
Wienboeker et al.

(10) Patent No.: US 10,141,742 B2
(45) Date of Patent: Nov. 27, 2018

(54) SYSTEM AND METHOD FOR PROVIDING A BALANCING POWER FOR AN ELECTRICAL POWER GRID

(71) Applicant: Caterva GmbH, Pullach im Isartal (DE)

(72) Inventors: Juergen Wienboeker, Valley (DE); Marc Moeller, Munich (DE); Roland Gersch, Munich (DE)

(73) Assignee: CATERVA GMBH, Pullach Im Isartal (DE)

( * ) Notice: Subject to any disclaimer, the term of this patent is extended or adjusted under 35 U.S.C. 154(b) by 217 days.

(21) Appl. No.: 15/241,366

(22) Filed: Aug. 19, 2016

(65) Prior Publication Data

US 2017/0063090 A1    Mar. 2, 2017

(30) Foreign Application Priority Data

Aug. 24, 2015 (EP) .................... 15182216

(51) Int. Cl.
| | |
|---|---|
| H02J 3/32 | (2006.01) |
| H02J 7/00 | (2006.01) |
| H02J 3/24 | (2006.01) |
| H02J 13/00 | (2006.01) |

(52) U.S. Cl.
CPC ............ *H02J 3/32* (2013.01); *H02J 7/0068* (2013.01); *H02J 3/24* (2013.01); *H02J 13/0006* (2013.01); *Y02E 60/722* (2013.01); *Y04S 10/14* (2013.01)

(58) Field of Classification Search
CPC .... H02J 3/32; H02J 3/24; H02J 13/006; H02J 7/0068; Y04S 10/14; Y02E 60/722
See application file for complete search history.

(56) References Cited

U.S. PATENT DOCUMENTS

| 2014/0239913 A1 | 8/2014 | Kudo et al. |
| 2016/0149419 A1 | 5/2016 | Gersch et al. |

FOREIGN PATENT DOCUMENTS

| KR | 10-1477648 B1 | 12/2014 |
| WO | 2014/198292 A1 | 12/2014 |

OTHER PUBLICATIONS

Extended European Search Report for European Application No. 15182216.0, dated Feb. 5, 2016, 7 pages.
Oudalov, Alexandre et al., "Optimizing a Battery Energy Storage System for Primary Frequency Control", IEEE Transactions on Power Systems, vol. 22, No. 3, Aug. 2007, 8 pages.

*Primary Examiner* — Robert Deberadinis
(74) *Attorney, Agent, or Firm* — Westman, Champlin & Koehler, P.A.

(57) ABSTRACT

A regulating system that in the event of a deviation from the nominal grid frequency provides a balancing power for an electrical power grid that is operated at a nominal grid frequency, wherein the regulating system comprises:
multiple energy storage system units that are connected by an inverter to the electrical power grid and comprise an energy storage device; and a control center that divides into sub-frequency intervals a frequency deviation interval that lies between a minimum grid frequency and a maximum grid frequency about the nominal grid frequency and, in dependence upon the states of charge of the energy storage devices allocates different energy storage system units, ESS, to each sub-frequency interval so as to form an ESS cluster for the respective sub-frequency interval.

17 Claims, 7 Drawing Sheets

SYSTEM AND METHOD FOR PROVIDING A BALANCING POWER FOR AN ELECTRICAL POWER GRID

CROSS-REFERENCE TO RELATED APPLICATION

This Application is a non-provisional Application of European Application No. 15182216.0, filed Aug. 24, 2015, which was filed in German and the contents of which are hereby incorporated by reference in its entirety.

FIELD OF THE INVENTION

The invention relates to a method and a regulating system that in the event of a deviation from the nominal grid frequency provide a balancing power for an electrical power grid or an electrical power supply grid that is operated at a nominal grid frequency.

TECHNICAL BACKGROUND

The balancing power that is also described as a reserve power or as a control energy ensures that imbalances (in the case of unforeseeable events) in an electrical power supply grid are redressed. An electrical power supply grid is operated at a nominal grid frequency. This nominal grid frequency is by way of example 50 Hz in the case of the European electrical power supply grid. In the normal grid operation, a maximum grid frequency deviation of by way of example +/−200 mHz is allowed. The balancing power is used to maintain an equilibrium between the electrical power generated in power plants and the electrical power drawn off by the electricity customers including transmission losses. Electrical power supply grids are unable to store energy so that at any point in time the magnitude of supplied electrical power must correspond to the total of the drawn-off electrical power and the power loss occurring as a result of transporting the power. Deviations from this equilibrium in the electrical power supply grid cause a change in the grid frequency that is uniformly synchronous in the entire electrical power supply grid or the electrical power grid. In the case of an oversupply of electrical power, the grid frequency deviates above the nominal grid frequency of the electrical power grid, whereas in the case of an undersupply of power a so-called underfrequency, in other words a grid frequency deviation less than the nominal grid frequency, occurs.

The so-called primary balancing power is used to compensate for any short-term frequency fluctuations. The primary balancing procedure is used to correct imbalances between the physical supply of power and the demand for power and its aim is to restore a stable grid frequency in the electrical power supply grid. Each grid operator within the integrated grid must make available within a specific period of time a certain percentage of their generated power as a primary balancing reserve. The primary balancing procedure is initiated within a few seconds in order to restore the grid frequency of the electrical power network back to the nominal grid frequency of by way of example 50 Hz. More balancing power thus corrects short-term imbalances between the supply and consumption of electricity or electrical power in the electrical power supply grid. The presence of imbalances can be established by way of a frequency deviation with respect to the nominal grid frequency. In the case of an excess supply, in other words in the case of a grid frequency of more than 50 Hz, a negative primary balancing power is provided, whereas in the case of an undersupply, in other words in the case of a grid frequency of less than 50 Hz, a positive primary balancing power is provided. The balancing power is provided by means of technical units that are provided for this purpose and must be provided in a linear manner up to a frequency deviation of +/−200 mHz.

Figure 1:
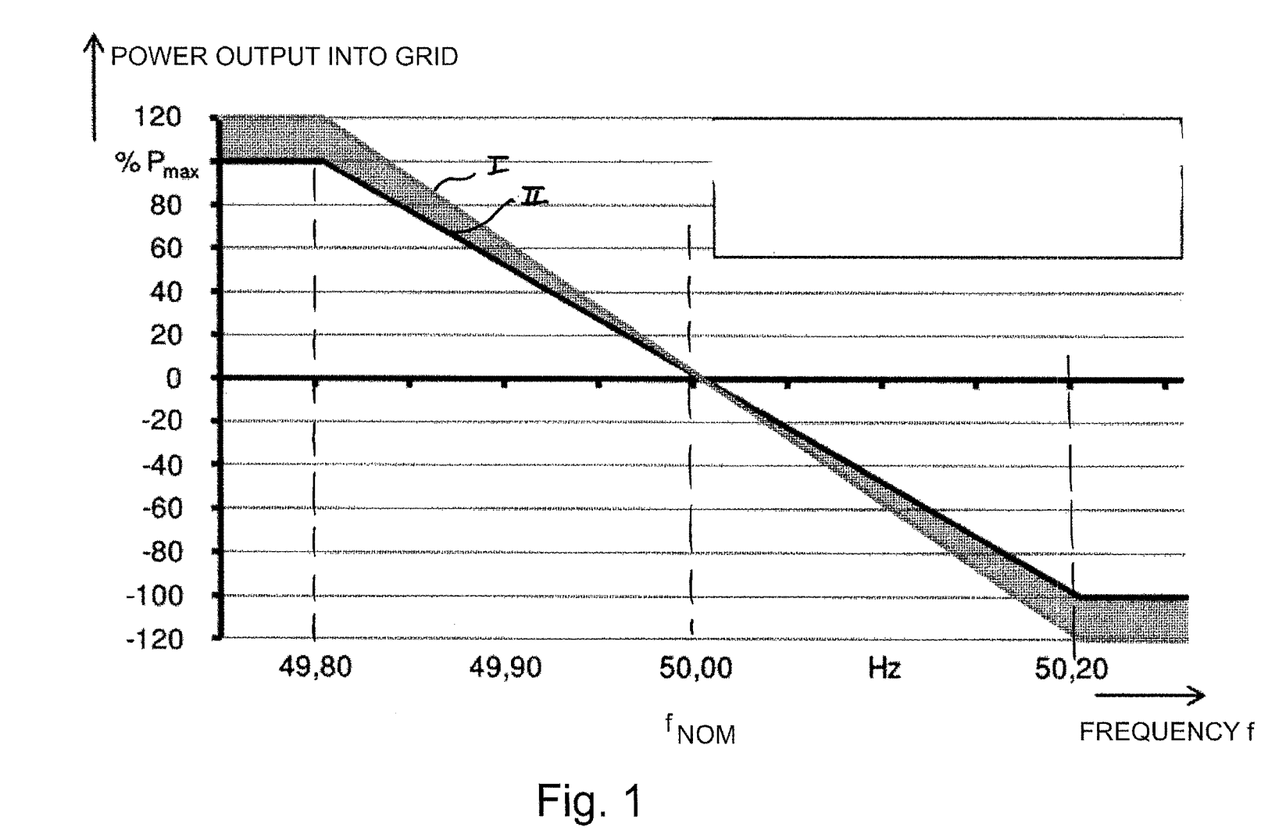
FIG. 1 illustrates a diagram for explaining a power regulating procedure that is performed within a conventional electrical power grid.

FIG. 1 illustrates the power output into the electrical power grid in dependence upon the grid frequency f for providing a primary balancing power PRL. If the grid frequency f is equal to a nominal grid frequency of 50 Hz, a primary balancing procedure is not performed. A primary balancing power is provided if there is a predetermined frequency deviation interval FAI of +/−200 mHz. If the grid frequency f is less than the nominal grid frequency $f_{nom}$ of 50 Hz, a positive primary balancing power pPRL is provided, wherein electrical power P is fed into the electrical power grid. If, on the other hand, the grid frequency f is greater than the nominal grid frequency $f_{nom}$, a negative primary balancing power nPRL is provided. As illustrated in FIG. 1, the balancing power RL is regulated in accordance with a linear power characteristic curve in a range between a maximum (curve I) and a minimum power characteristic curve (curve II). The electrical energy that is required for the balancing power can be stored. For this purpose, direct current storage devices or batteries are used in a conventional electrical power grid. The interface between the electrical power supply grid and the energy storage device is formed by means of a converter or an inverter that converts alternating current into direct current and direct current into alternating current. The degree of efficiency of the converter is dependent upon the power. The higher the converted power P, the greater the degree of efficiency of the inverter. In addition, there is a minimum power loss that the inverter or the converter itself consumes in the case of the lowest powers. This minimum power loss is only avoided in the case of a zero power.

Figure 2:
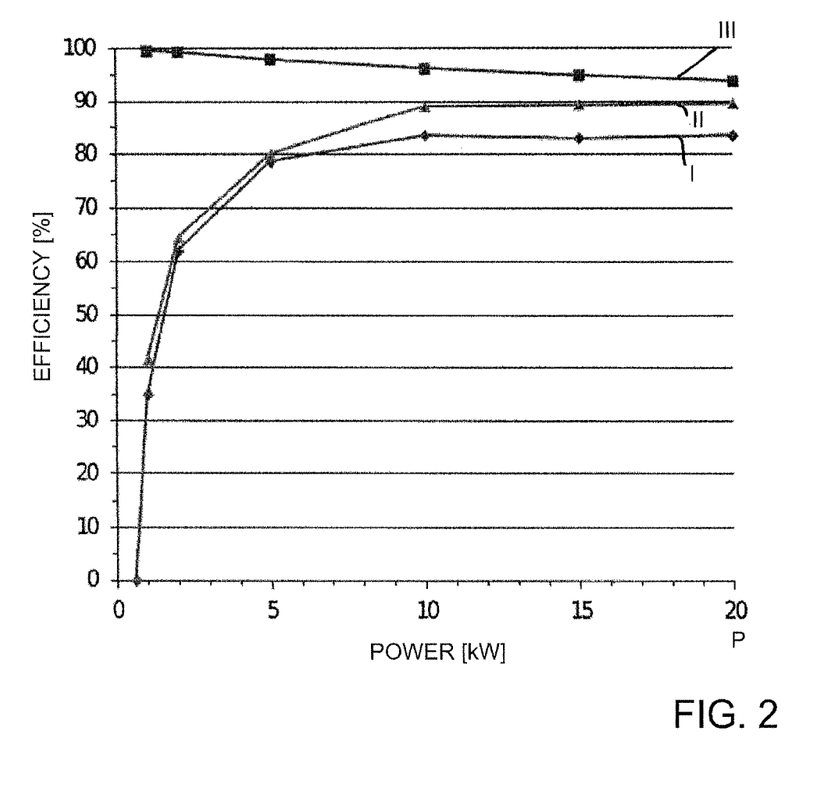
FIG. 2 illustrates a diagram for explaining the degree of efficiency in the case of a conventional energy storage system for explaining a technical problem on which the invention is based.

FIG. 2 illustrates the degree of efficiency of an energy storage system unit ESS in dependence upon the electrical power P, said energy storage system comprising an energy storage device or a battery and also an inverter. The degree of efficiency of the entire system or of the energy storage system unit is illustrated in the curve I. The curve II illustrates the degree of efficiency of the inverter within the energy storage system unit and the curve III illustrates the degree of efficiency of the energy storage device that is included in the energy storage system unit or the battery that is included in said energy storage system unit.

The operating point AP of an inverter or converter within an energy storage system unit ESS when providing a primary balancing power PRL is in the lower power range (P<1 KW). As is evident in FIG. 2, the degree of efficiency of the inverter is relatively low in this power range, as a consequence of which high electrical losses occur during the operation of the inverter. This behaviour is caused as a result of the fact that small disturbances in the equilibrium occur within the electrical power supply grid considerably more frequently than large disturbances.

Furthermore, in the case of high charge or discharge capacities, the energy storage devices or batteries that are used are heavily loaded which results in the serviceable life of the energy storage devices significantly reducing.

Figure 3:
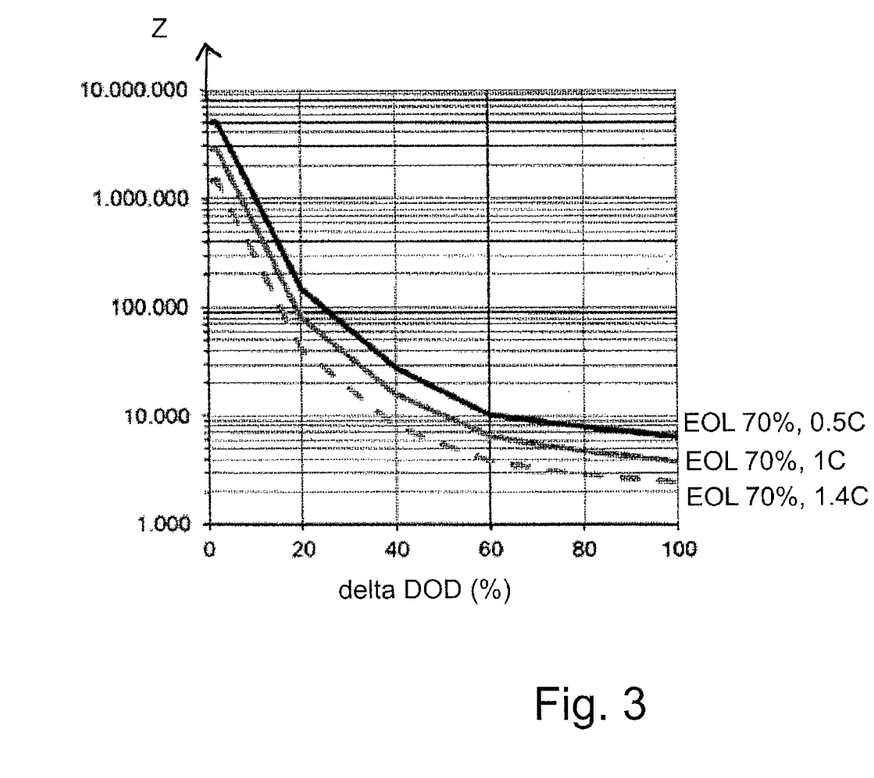
FIG. 3 illustrates a diagram so as to illustrate the serviceable life of energy storage devices in dependence upon charging or discharging cycles.

FIG. 3 illustrates the serviceable life of energy storage devices or batteries in dependence upon the number Z of charging or discharging cycles in dependence upon the depth of discharge (DOD) and in dependence upon the electrical power.

The degree of efficiency of the battery and of the energy storage device reduces in addition with the inverter power.

This effect is however considerably less than the increase in the degree of efficiency of the inverter with the increasing power P. This effect can therefore be taken into consideration implicitly as a part of the change in the degree of efficiency of the inverter.

Accordingly there is a need to provide a method and a system for providing a balancing power for an electrical power grid, wherein the power loss that occurs is minimized by energy storage system units.

SUMMARY OF THE INVENTION

According to an aspect of the present invention a regulating system is provided that in the event of a deviation from the nominal grid frequency provides a balancing power for an electrical power grid that is operated at a nominal grid frequency,
wherein the regulating system comprises:
multiple energy storage system units that are connected in each case by way of an inverter to the electrical power grid and comprise in each case at least one energy storage device and a control centre that divides into sub-frequency intervals a frequency deviation interval that lies between a minimum grid frequency and a maximum grid frequency about the nominal grid frequency and, in dependence upon the states of charge of the energy storage devices that are included in the energy storage system units, allocates different energy storage system units to each sub-frequency interval so as to form an ESS cluster for the respective sub-frequency interval, said cluster delivering a portion of the balancing power that is to be provided by means of the regulating system in each sub-frequency interval.

In the case of the regulating system in accordance with the invention, the inverters of the different energy storage system units operate in each case at an operating point at which the degree of efficiency of the respective inverter is relatively high and consequently the power loss that is occurring in the inverter is low. Consequently, clusters of energy storage system units ESS are operated in such a manner that their inverters are well utilized and operate at a high degree of efficiency.

In the case of one possible embodiment of the regulating system in accordance with the invention, the energy storage system units comprise in each case a local control unit, each of which are connected by way of a wireless network to the control centre of the regulating system.

In the case of a further possible embodiment of the regulating system in accordance with the invention, the energy storage system units comprise in each case a local control unit and each local control unit is connected by way of a wire-connected data network to the control centre of the regulating system.

In the case of a further possible embodiment of the regulating system in accordance with the invention, the local control unit of an energy storage system unit receives the state of charge of the energy storage device within the energy storage system unit from a management unit of the energy storage device and reports the state of charge to the control centre of the regulating system.

In the case of a further possible embodiment of the regulating system in accordance with the invention, the control centre of the regulating system sorts the energy storage system units separately according to the reported states of charge of the energy storage devices that are included in the energy storage system units according to their ability to provide balancing power for a positive balancing power and a negative balancing power.

In the case of a further possible embodiment of the regulating system in accordance with the invention, the control centre of the regulating system controls the local control units of the energy storage system units so as to output a positive balancing power to the electrical energy grid by way of the inverters of the energy storage system units in the event that the measured grid frequency of the electrical power grid is less than the nominal grid frequency.

In the case of a further possible embodiment of the regulating system in accordance with the invention, the control centre of the regulating system controls the local control units of the energy storage system units so as to output a negative balancing power to the electrical power network by way of the inverters of the energy storage system units in the event that the measured grid frequency of the electrical power grid is above the nominal grid frequency.

In the case of a further possible embodiment of the regulating system in accordance with the invention, so as to provide a positive balancing power, the control centre of the regulating system forms the ESS clusters of energy storage system units required for this purpose and the energy storage devices of said energy storage system units comprise a high state of charge.

In the case of a further possible embodiment of the regulating system in accordance with the invention, so as to provide a negative balancing power, the control centre forms the ESS clusters of energy storage system units required for this purpose and the energy storage devices of said energy storage system units comprise a low state of charge.

In the case of a further possible embodiment of the regulating system in accordance with the invention, so as to provide a balancing power, the control centre adds the energy storage system units to an ESS cluster that is provided for the sub-frequency interval and said energy storage system units are sorted according to the states of charge, in sequence until a portion, which is to be provided by means of the ESS cluster, of the balancing power that is to be provided by means of the regulating system overall is achieved within the sub-frequency interval by means of the corresponding ESS cluster.

In the case of a further possible embodiment of the regulating system in accordance with the invention, the control centre of the regulating system forms a different cluster both for a positive balancing power that is to be provided by means of the regulating system and also for a negative balancing power that is to be provided by means of the regulating system.

In the case of a further possible embodiment of the regulating system in accordance with the invention, after the ESS clusters have been formed, the control centre of the regulating system generates at least one strategy (set of rules) for providing power for each energy storage system unit of the regulating system and transmits the generated strategy to the local control unit of the respective energy storage system unit.

In the case of a further possible embodiment of the regulating system in accordance with the invention, the strategy for providing power, said strategy being generated for an energy storage system unit of an ESS cluster, indicates the two limit frequencies of the corresponding sub-frequency interval and a power that is to be provided by means of the energy storage system unit within this sub-frequency interval.

In the case of a further possible embodiment of the regulating system in accordance with the invention, the local control unit of an energy storage system unit automatically performs the strategies for providing power, said strategies being received from the control centre of the regulating system, in dependence upon a measured grid frequency of the electrical power grid and said local control unit transmits a corresponding feedback to the control centre of the regulating system.

In the case of a further possible embodiment of the regulating system in accordance with the invention, the energy storage system units of the regulating system comprise in each case a local frequency measuring unit for measuring the grid frequency of the electrical power grid.

In the case of a further possible embodiment of the regulating system in accordance with the invention, the control centre of the regulating system divides the frequency deviation interval symmetrically or asymmetrically into different sub-frequency intervals.

In the case of a further possible embodiment of the regulating system in accordance with the invention, the regulating system outputs a positive or a negative balancing power to the electrical power grid so as to stabilize the grid.

The balancing power in the case of a possible embodiment is a primary balancing power that is output by means of the regulating system to the electrical power grid so as to stabilize the grid.

According to a further aspect, an electrical power grid having a transmission network and a distribution network is provided and at least one regulating system in accordance with the invention is connected to said electrical power grid, wherein said regulating system delivers a balancing power so as to stabilize the grid of the electrical power grid and said regulating system comprises multiple energy storage system units that are connected in each case by way of an inverter to the electrical power grid and in each case comprise at least one energy storage device and a control centre that divides into sub frequency intervals a frequency deviation interval that lies between a minimum grid frequency and a maximum grid frequency about the nominal grid frequency and, in dependence upon the states of charge of the energy storage device that is included in the energy storage system units, allocates different energy storage system units to each sub-frequency interval so as to form an ESS cluster for the respective sub-frequency interval, said cluster delivering a portion of the balancing power that is to be provided by means of the regulating system in the respective sub-frequency interval.

According to a further aspect of the present invention a control centre for a regulating system is provided, wherein the control centre comprises a control unit that divides into sub-frequency intervals a frequency deviation interval that lies between a minimum grid frequency and a maximum grid frequency about a nominal grid frequency and, in dependence upon the reported states of charge of the energy storage devices that are included in the energy storage system units, allocates different energy storage system units to each sub-frequency interval so as to form an ESS cluster for the respective sub-frequency interval.

According to a further aspect of present the invention an energy storage system unit for a regulating system is provided, said energy storage system comprising
at least one energy storage device for storing electrical energy,
an inverter for converting electrical power between alternating current and direct current, said inverter being connected to the electrical power grid, and having
a local control unit that is connected by way of an interface to the control centre of the regulating system, wherein the local control unit of the control centre reports the prevailing state of charge of the energy storage device to the control centre by way of the interface and receives by way of the interface at least one strategy for providing power, said strategy being generated by means of the control centre.

In the case of a possible embodiment of the energy storage system unit in accordance with the invention, the energy storage system unit comprises moreover a local frequency measuring unit that measures the prevailing grid frequency of the electrical power grid and reports the measurement to the local control unit of the energy storage system unit.

In the case of a further possible embodiment of the energy storage system unit in accordance with the invention, the local control unit of the energy storage system unit automatically performs the strategy for providing power, said strategy being received from the control centre, in dependence upon the measured prevailing grid frequency of the electrical power grid by means of controlling the inverter of the energy storage system unit.

According to a further aspect of the present invention a method for balancing power for an electrical power grid is provided, wherein in the event of deviations from the nominal grid frequency, a balancing power for an electrical power grid that is operated at a nominal grid frequency is provided, said method having the steps:
by means of a control centre of a regulating system dividing into sub-frequency intervals a frequency deviation interval that lies between a minimum grid frequency and a maximum grid frequency about the nominal grid frequency, and
allocating energy storage system units of the regulating system to the sub-frequency intervals so as to form ESS clusters for the different sub-frequency intervals,
wherein the ESS clusters that are formed deliver in each case a portion of the balancing power that is to be provided by means of the regulating system overall in the respective sub-frequency interval.

BRIEF DESCRIPTION OF FIGURES

Furthermore, possible embodiments of the system and method in accordance with the invention for providing a balancing power are further described with reference to the attached figures.

In the figures.

DETAILED DESCRIPTION OF EMBODIMENTS

Figure 4:
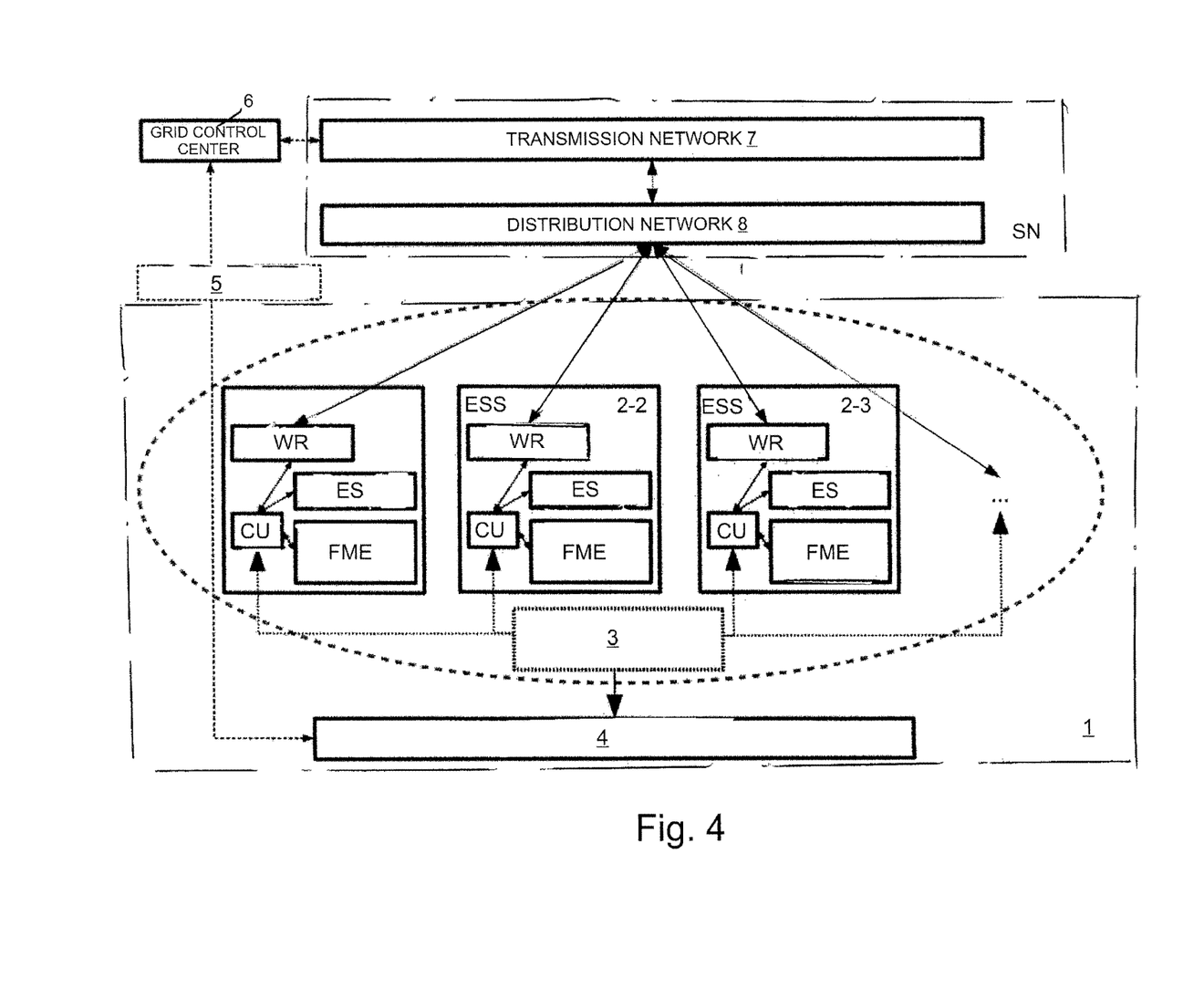
FIG. 4 illustrates an arrangement so as to illustrate an exemplary embodiment of a regulating system in accordance with the invention.

As is evident in FIG. 4, a regulating system 1 in accordance with the invention in the case of the illustrated exemplary embodiment comprises multiple energy storage system units ESS 2-1, 2-2, 2-3. The number of the energy storage system units ESS 2-$i$ can vary. In the case of the exemplary embodiment illustrated in FIG. 4, the regulating system 1 comprises three energy storage system units 2-1, 2-2, 2-3. The regulating system 1 comprises at least one energy storage system unit 2-$i$. The energy storage system units 2-$i$ comprise in each case a local control unit CU, each of which are connected by way of a wireless network 3 to a control centre 4 of the regulating system 1. As an alternative, the local control units CU of the different energy storage system units can be connected by way of a wire-connected data network to the control centre 4. The control centre 4 is a local control centre of the respective regulating system 1 that can also be described as a swarm control centre, SLS. This swarm control centre 4 is responsible for a group or a swarm of energy storage system units 2-$i$. The swarm control centre 4 of the regulating system 1 is preferably connected by way of a further communication connection 5 to a grid control centre 6 of the electrical power grid SN. In the case of the exemplary embodiment illustrated in FIG. 4, the electrical power grid SN comprises a transmission network 7 and a distribution network 8. The electrical power grid SN is preferably an alternating current grid that is operated at a nominal grid frequency $f_{nom}$ of by way of example 50 Hz. As is evident in FIG. 4, each energy storage system unit 2-$i$ comprises in each case a converter or an inverter WR that is connected to the distribution network 8 of the electrical power grid SN. In addition, each energy storage system unit 2-$i$ comprises at least one energy storage device ES for storing electrical energy. The energy storage device ES can comprise one or multiple batteries or rechargeable batteries. The energy storage device ES is used to store electrical energy. In the case of the exemplary embodiment illustrated in FIG. 4, each energy storage system unit 2-$i$ comprises in addition a local frequency measuring unit FME for measuring the prevailing grid frequency f of the electrical power grid SN.

The control centre 4 of the regulating system 1 divides into sub-frequency intervals SFI a frequency deviation interval FAI that lies between a minimum grid frequency $f_{min}$ and a maximum grid frequency $f_{max}$ about the nominal grid frequency $f_{nom}$ and, in dependence upon the states of charge SOC of the energy storage devices ES that are included in the energy storage system units 2-$i$, allocates different energy storage system units to each sub-frequency interval SFI so as to form an ESS cluster for the respective sub-frequency interval SFI, wherein the ESS cluster that is formed delivers a portion of the balancing power RL that is to be provided by means of the regulating system 1 in the respective sub-frequency interval SFI. The energy storage devices ES have access in one possible embodiment to a management unit or battery management unit and report the prevailing state of charge SOC of the energy storage device ES to the local control unit CU of the energy storage system unit 2-$i$. In the case of one possible embodiment, the local control unit CU transmits the reported state of charge SOC of the respective energy storage device ES to the control centre 4 of the regulating system 1 by way of the network 3. The control centre 4 of the regulating system 1 sorts the energy storage system units 2-$i$ separately according to the reported states of charge of the energy storage devices ES that are included in the energy storage system units 2-$i$ according to their ability to provide the balancing power for a positive balancing power pRL and for a negative balancing power nRL. It is preferred that the control centre 4 forms different ESS clusters both for a positive balancing power pRL that is to be provided by means of the regulating system 1 and also for a negative balancing power nRL that is to be provided by means of the regulating system 1.

In the event that the measured grid frequency f of the electrical power grid SN is less than the nominal grid frequency $f_{nom}$ of the electrical power grid SN, the control centre 4 of the regulating system 1 controls the local control units CU of the different energy storage system units 2-$i$ so as to output a positive balancing power pRL by way of the inverter WR of the energy storage system unit 2-$i$. Conversely, in the event that the measured grid frequency f of the electrical power grid SN lies above the nominal grid frequency $f_{nom}$, the control centre 4 of the regulating system 1 controls the local control units CU of the different energy storage system units 2-$i$ so as to output a negative balancing power nRL to the electrical power grid SN by way of the inverter WR of the energy storage system units 2-$i$. So as to provide a positive balancing power pRL, the control centre 4 forms the ESS clusters of energy storage system units 2-$i$ required for this purpose and the energy storage devices ES of said energy storage system units comprise high states of charge SOC. Moreover, so as to provide a negative balancing power nRL, the control centre 4 forms the ESS clusters of energy storage system units 2-$i$ required for this purpose and the energy storage devices ES of said energy storage system units comprise low states of charge. So as to provide a balancing power RL, the control centre 4 adds to an ESS cluster that is provided for the sub-frequency interval SFI the energy storage system units 2-$i$, which are sorted according to the states of charge SOC, in sequence until a portion, which is to be provided by the respective ESS cluster 2-1, of the balancing power that is to be provided by means of the regulating system 1 overall is achieved within the associated sub-frequency interval SFI by means of the corresponding ESS cluster.

After the ESS clusters have been formed, the control centre 4 of the regulating system 1 generates at least one strategy for providing power for each energy storage system unit 2-$i$ of the regulating system 1 and transmits this generated strategy for providing power to the local control unit CU of the respective energy storage system unit 2-$i$. The strategy for providing power, said strategy being generated for an energy storage system unit 2-$i$ of an ESS cluster preferably indicates the two limit frequencies of the corresponding sub-frequency interval SFI and an electrical power that is to be provided by means of the energy storage system unit 2-$i$ within this sub-frequency interval SFI. The local control unit CU of an energy storage system unit 2-$i$ automatically performs the strategies for providing power that are received from the control centre 4 of the regulating system 1 in dependence upon a measured grid frequency f of the electrical power grid. It is preferred that the local control unit CU then transmits corresponding feedback back to the control centre 4 of the regulating system 1 and said control centre reports that the received strategy has been performed. It is preferred that the grid frequency f of the electrical power grid SN is measured by means of a local frequency measuring unit FME within the energy storage system units 2-$i$. It is preferred that the different energy storage system units 2-$i$ of the regulating system 1 comprise in each case a local frequency measuring unit FME for measuring the grid frequency f of the electrical power grid SN.

In the case of one possible embodiment, the regulating system 1 outputs a positive or a negative primary balancing power PRL to the electrical power grid SN so as to stabilize the grid. In the case of an alternative embodiment, the regulating system 1 can provide a secondary regulating procedure SRL so as to stabilize the grid frequency. The secondary regulating procedure is likewise intended to restore an equilibrium between the physical electrical power supply and the demand for electrical power after a difference has occurred. In contrast to the primary regulating procedure PR, in the case of the secondary regulating procedure SR only the situation in the respective regulating zone inclusive of the electrical power exchange with other regulating zones is considered. For this purpose, the planned power flows and the actual power flows are compared to other regulating zones and balanced. It is possible to ensure that PRL and SRL do not counteract one another. The primary regulating procedure and the secondary regulating procedure can start simultaneously. It is preferred that the secondary regulating procedure triggers the primary regulating procedure after a few minutes have elapsed so that the primary regulating procedure is available once again.

The control centre 4 of the regulating system 1 divides the frequency deviation interval FAI symmetrically or asymmetrically into different sub-frequency intervals. As illustrated in FIG. 1, the frequency deviation interval FAI in the case of one possible embodiment can lie symmetrically about a nominal grid frequency $f_{nom}$ of 50 Hz and have a frequency range of +/−200 mHz. The lower limit frequency $f_u$ of the frequency deviation interval FAI is 49.8 Hz and the upper limit frequency $f_o$ of the frequency deviation interval is 50.2 Hz, as illustrated in FIG. 1.

Figure 5:
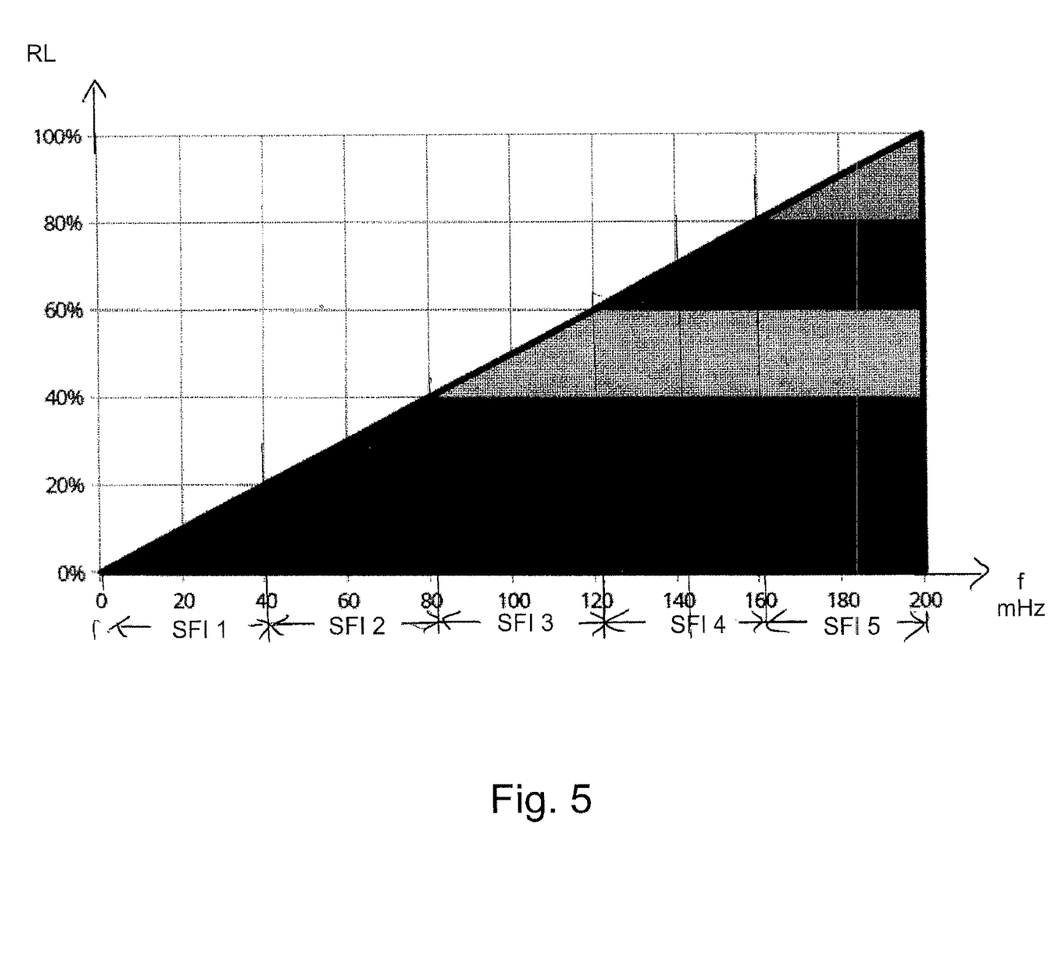
FIG. 5 illustrates a diagram so as to explain the manner in which one embodiment of the regulating system in accordance with the invention functions.

FIG. 5 illustrates an exemplary embodiment, wherein the control centre 4 of the regulating system 1 divides the frequency deviation interval FAI on both sides symmetrically into different sub-frequency intervals SFI with the identical frequency range. In the case of the example illustrated in FIG. 5, the frequency deviation interval FAI is divided on both sides into five different sub-frequency intervals SFI-1, SFI-2, SFI-3, SFI-4, SFI-5. Each sub-frequency interval SFI comprises in the case of the illustrated exemplary embodiment a range of 40 mHz. The control centre 4 of the regulating system 1 can form an associated ESS cluster for each sub-frequency interval SFI. The control centre 4 allocates different energy storage system units ESS 2-*i* to each sub-frequency interval SFI so as to form the ESS cluster for the respective sub-frequency interval SFI, wherein the formed ESS cluster delivers a portion of the balancing power RL that is to be provided by means of the regulating system 1 in the respective sub-frequency interval SFI. The control centre 4 calculates the frequency division and the allocation of the energy storage system units 2-*i* and distributes appropriate strategies for providing power to the different energy storage system units 2-*i*. Within each sub-frequency interval SFI, each energy storage system unit ESS provides the balancing power in a linear manner from zero power up to a maximum balancing power. The energy storage system units 2-*i* with allocated sub-frequency intervals SFI close to the nominal grid frequency $f_{nom}$ of the electrical power grid SN therefore spend in comparison to the conventional operating method a greater portion of operating time at greater powers P and thus operate more effectively as a result of the greater degree of efficiency, in particular the greater degree of efficiency of the inverter WR that is included therein. In comparison thereto, the energy storage system units 2-*i* with allocated sub-frequency intervals SFI outside the nominal grid frequency $f_{nom}$ spend a greater portion of their operating time at zero power so that also in this case electrical power is not lost. The two increases thus have a favourable effect on the overall degree of efficiency η of the system since greater degrees of efficiency are achieved and minimum losses of power are avoided. The number of the different sub-frequency intervals SFI of the corresponding ESS cluster can vary. In the case of the exemplary embodiment illustrated in FIG. 5, the control centre 4 divides the frequency deviation interval FAI symmetrically into five different sub-frequency intervals SFI with an identical frequency range.

Figure 6:
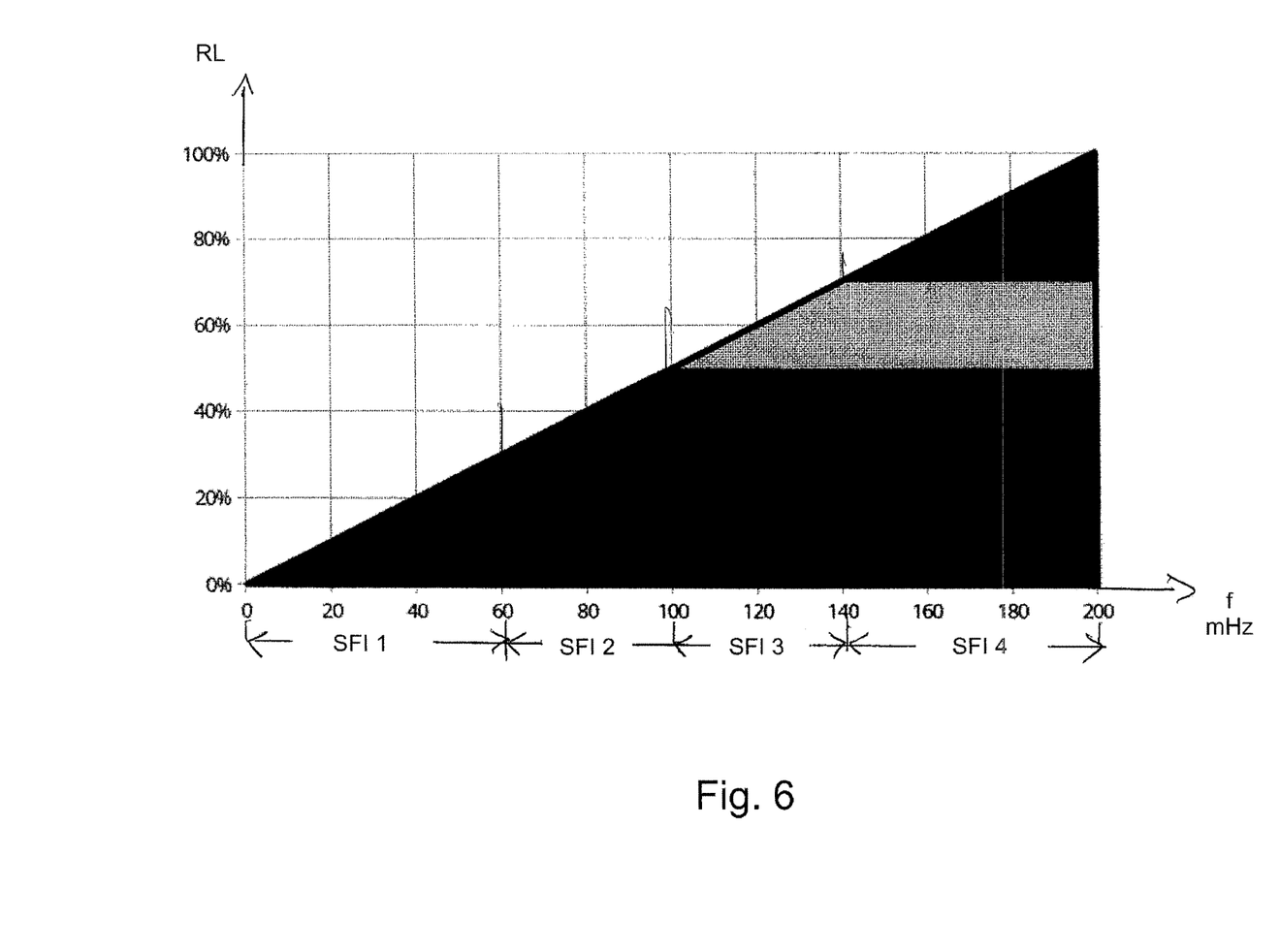
FIG. 6 illustrates a further diagram so as to explain the manner in which one embodiment of the regulating system in accordance with the invention functions.

In the case of the further exemplary embodiment illustrated in FIG. 6, the control centre 4 of the regulating system 1 divides the frequency deviation interval FAI asymmetrically. In the case of the example illustrated in FIG. 6, the frequency deviation interval FAI is divided into four sub-frequency intervals SFI-1, SFI-2, SFI-3, SFI-4. In the case of the illustrated example, the first and the fourth sub-frequency interval have a frequency range of 60 mHz, whereas the two frequency intervals SFI-2, SFI-3 that lie in the middle have only a frequency range of 40 mHz. By way of example, in the case of the example illustrated in FIG. 6, the ESS cluster I that is provided for the first sub-frequency interval SFI-1 comprises fifteen energy storage system units 2-*i* and provides a balancing power RL, in particular a primary balancing power PRL, in the frequency range between 0 and 60 mHz. The second ESS cluster II that is provided for the second sub-frequency interval SFI-2 comprises by way of example ten energy storage system units 2-*i* for providing a primary regulating procedure PL in a frequency range between 60 mHz and 100 mHz. The third ESS cluster III comprises by way of example ten energy storage system units 2-*i* for providing a regulating power RL in a frequency range between 100 mHz and 140 mHz. The fourth ESS cluster IV comprises by way of example ten energy storage system units 2-*i* for providing a regulating power RL in a frequency range of 140 mHz to 200 mHz. In the illustrated example, in the case of a frequency deviation Δf of 60 mHz from the nominal frequency $f_{nom}$ the ESS cluster I would provide its maximum balancing power RL that is predetermined by the strategy, whereas all other clusters would not provide a balancing power. In the case of a frequency deviation Δf of 80 mHz from the nominal frequency $f_{nom}$ the first ESS cluster 1 will provide the maximum balancing power and the second ESS cluster II will provide 50% of the maximum balancing power allocated to it. The two other clusters III and IV would not provide any balancing power RL in this case.

The number of the ESS clusters can be adjusted in a variable manner in the case of the regulating system 1 in accordance with the invention. Furthermore, the limits or limit frequencies of the respective clusters can also be set in a variable manner. It is ensured in any case by means of the control centre 4 that the addition of the power curves of the individual ESS clusters reproduces the identical total balancing power curve that would have been achieved in the case of the balancing power distribution in which clusters have not been formed. Different ESS clusters are formed for the positive and negative balancing power, wherein the capacity of the individual ESS storage unit determines which ESS cluster is to be allocated or assigned the individual ESS storage unit by means of the control centre 4. An energy storage system unit 2-*i* having an energy storage device ES whose state of charge SOC has moved considerably away from the middle value or normal value can be allocated by way of example so as to provide a positive primary balancing power pPRL to a cluster P1 and so as to provide a negative balancing power nRL to another cluster N3. The A- or limit frequencies and power values are calculated by means of the control centre 4 of the regulating system 1 and distributed to the different energy storage system units 2-*i* by way of strategies for providing power.

A strategy or a set of rules that is generated by means of the control centre 4 of the regulating system 1 of an energy storage system unit 2-$i$ can be by way of example:
Negative balancing power:
Minimum frequency: 40 mHz
Maximum frequency: 80 mHz
Power: 15 KW
Positive balancing power:
Minimum frequency: −80 mHz
Maximum frequency: −120 mHz
Power: 10 KW It is preferred that the control centre 4 forms the clusters on the basis of the state of charge SOC of the energy storage device ES of the respective energy storage system unit. The energy storage system units 2-$i$ are sorted by means of the control centre 4 on the one hand for positive and negative balancing power according to the reported state of charge SOC. The sequence determines in which ESS cluster the respective energy storage system unit 2-$i$ is to be used. In this manner, the control centre 4 distributes the total charge uniformly over the energy storage system units ESS. The individual energy storage system units 2-$i$ do not comprise any explicit information regarding in which ESS cluster they are located but rather they recognize only the associated frequency ranges.

An energy storage system unit ESS whose energy storage device ES has a relatively high state of charge SOC can output a relatively large amount of electrical energy yet can only receive a relatively small amount of electrical energy. If by way of example one energy storage system unit 2-1 comprises an energy storage device ES1 with a state of charge SOC of 90%, a second energy storage system unit 2-2 comprises an energy storage device ES2 with a state of charge SOC of 50% and a third energy storage system unit 2-3 comprises an energy storage device ES3 whose state of charge amounts to 10%, it is possible for the control centre 4 to sort said energy storage system units into a positive and a negative balancing power. In the case of the illustrated example, the energy storage system unit 2-1 is more suitable for providing a positive balancing power pRL than the energy storage system units 2-2 and 2-3. Accordingly, the three energy storage system units 2-1, 2-2, 2-3 are sorted in this sequence by means of the control centre 4 of the regulating system 1 so as to provide a positive balancing power pRL. Conversely, the energy storage system unit 2-1 is less suitable for providing a negative balancing power nRL than the two other energy storage system units 2-2, 2-3. In this case, so as to provide the negative balancing power nRL, the energy storage system units can be pre-sorted by means of the control centre 4 as follows: 2-3, 2-2, 2-1.

In the case of the regulating system 1 in accordance with the invention, the energy storage system units 2-$i$ are formed into clusters. The control centre 4 forms different ESS clusters or in dependence upon the states of charge SOC of the energy storage devices ES that are included in the energy storage system units 2-$i$. The control centre 4 divides the frequency deviation interval FAI into sub-frequency intervals SFI and, in dependence upon the states of charge SOC of the energy storage devices ES that are included in the energy storage system units 2-$i$, allocates different energy storage system units 2-$i$ to each sub-frequency interval so as to form the respective ESS clusters for the respective sub-frequency interval SFI.

Subsequently, the control centre 4 generates a strategy for providing power and transmits the generated strategy to the respective energy storage system unit 2-$i$.

It is preferred that the strategy for providing power, said strategy being generated for an energy storage system unit 2-$i$ of an ESS cluster comprises the two limit frequencies of the corresponding sub-frequency intervals SFI and an electrical power that is to be provided by means of the energy storage system unit 2-$i$ within this sub-frequency interval. The local control unit CU of the respective energy storage system unit automatically performs the strategy for providing power, said strategy being received from the control centre 4, in dependence upon a measured grid frequency f of the electrical power grid SN and subsequently transmits feedback to the control centre 4 of the regulating system 1. According to a selected allocation algorithm, the frequency deviation interval FAI is divided in a linear manner, as illustrated in FIG. 5, wherein different ESS clusters are formed. The desired maximum power of the individual ESS clusters is established. In the case of the illustrated embodiment, this desired maximum power amounts to $0.2 \times P_{PRLmax}$. The limit frequencies are selected accordingly, by way of example for ESS cluster I 0 to 40 mHz and for cluster II 40 to 80 mHz, as illustrated in FIG. 5. Subsequently, the energy storage system units 2-$i$ are sorted separately by means of the control centre 4 according to their ability to provide balancing power RL for the positive balancing power pRL and the negative balancing power nRL. The energy storage system units that are best suited for the balancing power direction are added to the first ESS cluster I until the desired target power is achieved by the ESS cluster 1. In the case of one possible embodiment, the power limits of the energy storage system units 2-$i$ are set slightly less than is theoretically possible in order to operate the battery or the energy storage device within the energy storage system units 2-$i$ in an optimum operating range. If the total of the individual capacities in the ESS cluster were to slightly exceed the desired target power up to a predetermined limit value, the value for the upper frequency limit of the ESS cluster will be slightly increased and the lower frequency limit of the subsequent ESS cluster accordingly slightly adjusted upwards. The subsequent ESS clusters are formed in a similar manner, wherein the total power of the clusters $P_{PRLmax}$ is fulfilled and the frequency upper limit of the last cluster ESS V corresponds to the upper limit frequency of the frequency deviation interval by way of example 200 mHz. The clusters are formed according to a corresponding allocation algorithm also for the balancing power of the opposing direction whilst taking into consideration the corresponding algebraic sign. The data or information that are obtained in this manner then form the component of the strategies for providing power for the energy storage system units 2-$i$.

Figure 7:
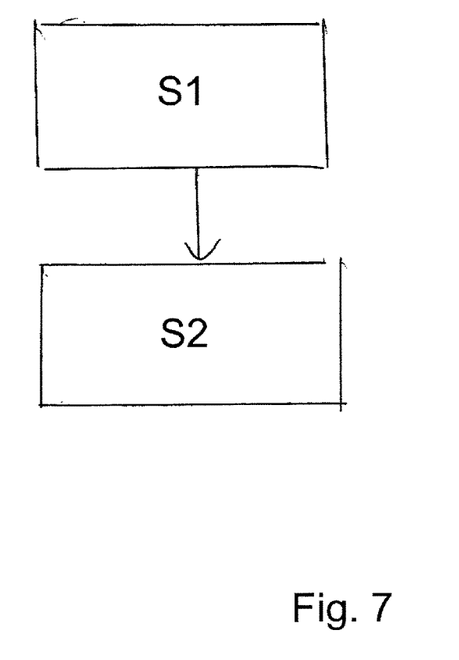
FIG. 7 illustrates a simple flow diagram so as to illustrate one exemplary embodiment of the method in accordance with the invention for providing a balancing power for an electrical power grid.

FIG. 7 illustrates a flow diagram so as to illustrate a possible exemplary embodiment of the method in accordance with the invention that in the event of a deviation from the nominal grid frequency provides a balancing power RL for an electrical power grid SN, which operates at a nominal grid frequency $f_{nom}$.

In a first step S1, a frequency deviation interval that lies between a minimum grid frequency $f_{min}$ and a maximum grid frequency $f_{max}$ about the nominal grid frequency $f_{nom}$ is divided into sub-frequency intervals SFI by means of a control centre 4 of the regulating system.

Subsequently, in a step S2, energy storage system units 2-$i$ of the regulating system 1 are allocated to the sub-frequency intervals SFI so as to form different ESS clusters for the different sub-frequency intervals. The ESS clusters that are formed deliver in each case a portion of the balancing power RL that is to be provided by the regulating system 1 as a whole in the respective sub-frequency interval SFI. The method can be implemented by a computer program that runs on a computer or microprocessor. It is preferred that this program runs on a control unit of the control centre 4 of the regulating system 1.

The invention claimed is:

1. A regulating system adapted to provide in the event of a deviation from a nominal grid frequency a balancing power for an electrical power grid that is operated at the nominal grid frequency, wherein the regulating system comprises:
multiple energy storage system, ESS, units that are connected in each case by means of an inverter to the electrical power grid and comprise in each case at least one energy storage device; and
a control centre adapted to divide into sub-frequency intervals a frequency deviation interval that lies between a minimum grid frequency and a maximum grid frequency around the nominal grid frequency and adapted, in dependence upon the states of charge of the energy storage devices that are included in the energy storage system, ESS, units, to allocate different energy storage system, ESS, units to each sub-frequency interval so as to form an ESS cluster for the respective sub-frequency interval, wherein said ESS-cluster delivers a portion of the balancing power that is to be provided by the regulating system in the respective sub-frequency interval.

2. The regulating system according to claim 1,
wherein the energy storage system, ESS, units comprise in each case a local control unit, each of which are connected to the control centre of the regulating system by way of a wireless network or a wire-connected data network,
wherein the local control unit of an energy storage system, ESS, unit reports the state of charge of the energy storage device of the energy storage system unit to the control centre of the regulating system.

3. The regulating system according to claim 2,
wherein the control centre of the regulating system is adapted to sort the energy storage system, ESS, units separately according to the reported states of charge of the energy storage devices that are included in the energy storage system, ESS, units according to their ability to provide balancing power for a positive balancing power and a negative balancing power.

4. The regulating system according to claim 3,
wherein, so as to provide a balancing power, the control centre adds to an ESS cluster that is provided for the sub-frequency interval the energy storage system, ESS, units that have been sorted according to the states of charge in sequence until a portion, which is to be provided by the ESS cluster, of the balancing power that is to be provided by the regulating system overall is achieved within the sub-frequency interval by means of the corresponding ESS cluster.

5. The regulating system according to claim 1,
wherein the control centre of the regulating system is adapted to control the local control units of the energy storage system, ESS, units so as to output a positive balancing power to the electrical power grid by way of the inverter of the energy storage system units if the measured grid frequency of the electrical power grid is less than the nominal grid frequency and
wherein the control centre of the regulating system is adapted to control the local control units of the energy storage system, ESS, units so as to output a negative balancing power to the electrical power grid by way of the inverter of the energy storage system units if the measured grid frequency of the electrical power grid is above the nominal grid frequency.

6. The regulating system according to claim 5,
wherein so as to provide a positive balancing power, the control centre of the regulating system forms the ESS clusters of energy storage system units required for this purpose and the energy storage devices of said energy storage system units comprise high states of charge, and
wherein, so as to provide a negative balancing power, the control centre forms the ESS clusters of energy storage system units required for this purpose and the energy storage devices of said energy storage system units comprise low states of charge.

7. The regulating system according to claim 5,
wherein the control centre of the regulating system forms different ESS clusters both for a positive balancing power that is to be provided by means of the regulating system and also for a negative balancing power that is to be provided by means of the regulating system.

8. The regulating system according to claim 1,
wherein, after the ESS clusters have been formed, the control centre of the regulating system is configured to generate at least one strategy for providing power for each energy storage system unit of the regulating system and to transmit the generated strategy to the local control unit of the respective energy storage system, ESS, unit.

9. The regulating system according to claim 8,
wherein the strategy that is generated for one energy storage system, ESS, unit of an ESS cluster for providing power indicates the two limit frequencies of the corresponding sub-frequency interval and a power that is to be provided by means of the energy storage system, ESS, unit within this sub-frequency interval.

10. The regulating system according to claim 9,
wherein the local control unit of an energy storage system unit is adapted to perform automatically the strategies for providing power, said strategies being received from the control centre of the regulating system in dependence upon a measured grid frequency of the electrical power grid, and to transmit a corresponding feedback to the control centre of the regulating system.

11. The regulating system according to claim 1,
wherein the energy storage system, ESS, units of the regulating system comprise in each case a local frequency measuring unit for measuring the grid frequency of the electrical power grid.

12. The regulating system according to claim 1,
wherein the control centre of the regulating system is adapted to divide the frequency deviation interval symmetrically or asymmetrically into different sub-frequency intervals.

13. The regulating system according to claim 1,
wherein the regulating system is adapted to output a positive or a negative primary balancing power to the electrical power grid so as to stabilize the power grid.

14. An energy storage system unit for a regulating system comprising
multiple energy storage system, ESS, units that are connected in each case by means of an inverter to the electrical power grid and comprise in each case at least one energy storage device; and
a control centre adapted to divide into sub-frequency intervals a frequency deviation interval that lies between a minimum grid frequency and a maximum grid frequency around the nominal grid frequency and adapted, in dependence upon the states of charge of the energy storage devices that are included in the energy storage system, ESS, units, to allocate different energy storage system, ESS, units to each sub-frequency interval so as to form an ESS cluster for the respective sub-frequency interval, wherein said ESS-cluster delivers a portion of the balancing power that is to be provided by the regulating system in the respective sub-frequency interval, at least one energy storage device for storing electrical energy, an inverter for converting electrical power between alternating current and direct current, said inverter being connected to the electrical power grid, and having a local control unit that is connected by way of an interface to the control centre of the regulating system, wherein the local control unit of the control centre is configured to report the prevailing state of charge of the energy storage device to the control centre by way of the interface and to receive by way of the interface at least one strategy for providing power, said strategy being generated by means of the control centre.

15. The energy storage system unit according to claim 14, wherein the energy storage system unit further comprises a local frequency measuring unit that is adapted to measure a prevailing grid frequency of the electrical power grid and to report the measurement to the local control unit of the energy storage system unit.

16. The energy storage system unit according to claim 15, wherein the local control unit of the energy storage system unit is adapted to perform automatically the strategy for providing power, said strategy being received from the control centre, in dependence upon the measured prevailing grid frequency of the electrical power grid by means of controlling the inverter of the energy storage system unit.

17. A method that in the event of a deviation from the nominal grid frequency provides a balancing power for an electrical power grid that is operated at a nominal grid frequency, said method having the steps:

by means of a control centre of a regulating system dividing into sub-frequency intervals a frequency deviation interval that lies between a minimum grid frequency and a maximum grid frequency about the nominal grid frequency, and allocating energy storage system units of the regulating system to the sub-frequency intervals so as to form ESS clusters for the different sub-frequency intervals, wherein the ESS clusters that are formed deliver in each case a portion of the balancing power that is to be provided by means of the regulating system overall in the respective sub-frequency interval.

* * * * *